(12) United States Patent
Alexander

(10) Patent No.: US 6,272,120 B1
(45) Date of Patent: *Aug. 7, 2001

(54) MULTI-RADIO BRIDGE

(75) Inventor: Bruce E. Alexander, Cuyahoga Falls, OH (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/789,999

(22) Filed: Jan. 28, 1997

(51) Int. Cl.[7] .............................. H04Q 7/24; H04L 12/28; H04J 4/00
(52) U.S. Cl. ...................... 370/338; 370/401; 370/436
(58) Field of Search .................................. 370/338, 401, 370/402, 400, 335, 320, 342, 441, 330, 321, 436, 478, 334, 537; 375/202; 455/13.3

(56) References Cited

U.S. PATENT DOCUMENTS

| 5,295,154 | * | 3/1994 | Meier et al. .................... 370/338 |
| 5,371,738 | * | 12/1994 | Moelard et al. . | |
| 5,410,738 | * | 4/1995 | Diepstraten et al. ............ 455/528 |
| 5,448,565 | | 9/1995 | Chang et al. . | |
| 5,504,746 | * | 4/1996 | Meier .............................. 370/338 |
| 5,515,378 | * | 5/1996 | Roy, III et al. ................. 370/334 |
| 5,581,575 | * | 12/1996 | Zehavi et al. ................... 370/335 |
| 5,619,493 | * | 4/1997 | Ritz et al. ....................... 370/330 |
| 5,737,703 | * | 4/1998 | Byrne ............................. 455/442 |
| 5,784,695 | * | 7/1998 | Upton et al. .................... 455/442 |
| 5,844,893 | * | 12/1998 | Gollnick et al. ................ 370/338 |

* cited by examiner

Primary Examiner—Chau Nguyen
Assistant Examiner—Phuongchau Ba Nguyen
(74) Attorney, Agent, or Firm—Arter & Hadden LLP

(57) ABSTRACT

A multi-radio bridge for cost effectively increasing the throughput associated with the bridging of multiple LANs together. The multi-radio bridge incorporates two or more radio devices which provide for substantially simultaneous communication between two or more client-bridges and the multi-radio bridge. Employment of the multiple radios allows for different hopping sequences and/or PN codes to be used so as to avoid collisions between information containing packets. The multi-radio bridge avoids the need to have to add a new bridge for every new LAN added to the system. Furthermore, in systems having extremely heavy traffic, the multi-radio bridge can dedicate two or more radios (operating at different FH sequences and/or PN codes) to one client-bridge thus doubling or more the amount of network traffic throughput.

19 Claims, 5 Drawing Sheets

MULTI-RADIO BRIDGE

TECHNICAL FIELD

The present invention relates generally to a cellular communication system utilizing wireless bridges to enhance system performance.

BACKGROUND

Local Area Networks (LANs) are widely used in the private and public sector to provide interconnectivity between computers affiliated with a building or site. LAN's typically consist of several computers connected together by a hardwired network. The hardwired network is often referred to as a system backbone. A server or host computer will also be connected to the backbone and serve as a central controller for the particular LAN. Recent advances in technology have also enabled LAN's to be used to interconnect wireless devices such as portable workslate computers, portable bar code readers, and the like. In such cases, access points or base stations are connected to the LAN to provide for wireless interfacing of such portable devices to the backbone.

Although connecting several computers or portable devices within a single building can readily be accomplished via the use of a LAN infrastructure, difficulties often arise when there exists more than one building or site which needs to be connected. Such is often the case on college campuses and businesses operating out of more than one building. For instance, in such cases it may be desirable to have a single host computer or server provide all buildings or sites with interconnected services such as e-mail and group directories. In order to utilize a single server and provide for communication between each building or site, some manner of interconnecting each LAN is needed.

One known method of interconnecting each LAN associated with a specified area is to physically make an additional hard wired connection between each LAN. Unfortunately, this is not only expensive and time consuming given the need to provide trenches and other passages for conduit and wiring to be installed between the sites, but also is oftentimes not possible when buildings are several miles apart or separated by parks, streams or other obstacles.

Consequently, wireless bridges have been developed in order to provide a method of connecting two or more LANs. A wireless bridge is a device which is physically connected to the LAN and can wirelessly transmit and receive data and other communications from other bridges connected to different LAN's. Thus, a wireless bridge allows several LAN's to become interconnected without the need for physically laying additional conduit and wiring.

As the number of installed LAN's increases, the need for bridging multiple LAN's together also increases. Thus, in order to bridge two or more remote LANs to the LAN having the main server, multiple bridges are connected to the LAN having the main server. Each of the bridges on the LAN having the main server is then dedicated to communication to a specified one of the remote LAN bridges. However, each bridge utilizes the same radio device and therefore communicate on the same frequency and same channel (i.e., in FH system the same hopping sequence, and in DS systems the same PN codes). In order to avoid in air collisions of data being transferred simultaneously between two different sets of bridges, each bridges time shares the airways using known time sharing protocols such as collision sense multiple access (CSMA). In a CSMA system, each bridge will effectively listen to the airway to ensure that it is free before transmitting information. More particularly, in a system operating under a CSMA protocol, each bridge "listens" to the signal traffic in the air before transmitting information in order to avoid collisions of packets containing information. If the air is busy with signal traffic, the bridge performs a random back off in order to allow time for the air to clear.

Unfortunately, as the number of installed LAN's which need interconnectivity increases, so does the wireless traffic which must be passed along. This often results in large system delays given that no two bridges can communicate at the same time. Furthermore, the cost associated with adding a bridge each time a new LAN is introduced can get expensive. Accordingly, there is a strong need in the art for a method and apparatus for cost effectively increasing the throughput associated with the bridging of multiple LANs together.

SUMMARY OF THE INVENTION

The present invention includes an apparatus and method for cost effectively increasing the throughput associated with the bridging of multiple LANs together. The present invention provides for a multi-radio bridge to be used in a cellular communication network, the multi-radio bridge incorporates two or more radio devices. The radios of the multi-radio bridge afford for simultaneous communication between two or more client-bridges and the multi-radio bridge. The simultaneous wireless communication is made possible via the employment of the multiple radios which allow for different hopping sequences and/or PN codes to be used so as to avoid collisions between information containing packets. Moreover, system cost is substantially reduced since the multi-radio bridge avoids the need to have to add a new bridge for every new LAN added to the system. Furthermore, in systems having extremely heavy traffic, the multi-radio bridge can dedicate two or more radios (operating at different FH sequences and/or PN codes) to one client-bridge thus doubling or more the amount of network traffic throughput.

According to one aspect of the invention, a cellular communication system is provided including: a first and second wireless client-bridge, the first client bridge being coupled to a first network backbones, the second client bridge being coupled to a second network backbone; and a multiple-radio bridge coupled to a third network backbone, the multiple-radio bridge including: first and second radio devices, the first radio device including a first transceiver, the second radio device including a second transceiver, the first radio device being designated for communications with the first client-bridge, and the second radio device being designated for communications with the second client-bridge, the radio devices providing for substantially simultaneous wireless communication between the multiple-radio bridge and the first and second wireless client-bridges.

In accordance with another aspect of the invention, a multi-radio bridge for use in a communications network is provided: a processor for controlling the operation of the multi-radio bridge; a memory coupled to the processor for storing routing information; at least one antenna for transmitting and receiving wireless communications; and a first and second radio device, the first radio device including a first transceiver, the second radio device including a second transceiver, the first radio device being designated for communications with a first client-bridge, and the second radio device being designated for communications with a second client-bridge, the radio devices providing for substantially simultaneous wireless communication between the multiple-radio bridge and the first and second wireless client-bridges.

According to yet another aspect of the present invention, a method for providing substantially simultaneous wireless communication between a first and second client-bridge in a communication network is provided including the steps of: using a multi-radio bridge to serve as an intermediary between the first and second client bridges, the multi-radio bridge including a first and second radio device, the first radio device including a first transceiver, the second radio device including a second transceiver; designating the first radio device for communications with the first client-bridge; and designating the second radio device for communications with the second client-bridge.

According to still yet another aspect of the present invention, a multi-radio bridge for use in a communications network is provided, including: a processor for controlling the operation of the multi-radio bridge; a memory for storing routing information; at least one antenna for transmitting and receiving wireless communications; and a plurality of radio devices, each of the plurality of radio devices being designated for communications with separate client-bridges, the plurality of radio devices providing for substantially simultaneous wireless communication between the client-bridges.

To the accomplishment of the foregoing and related ends, the invention, then comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
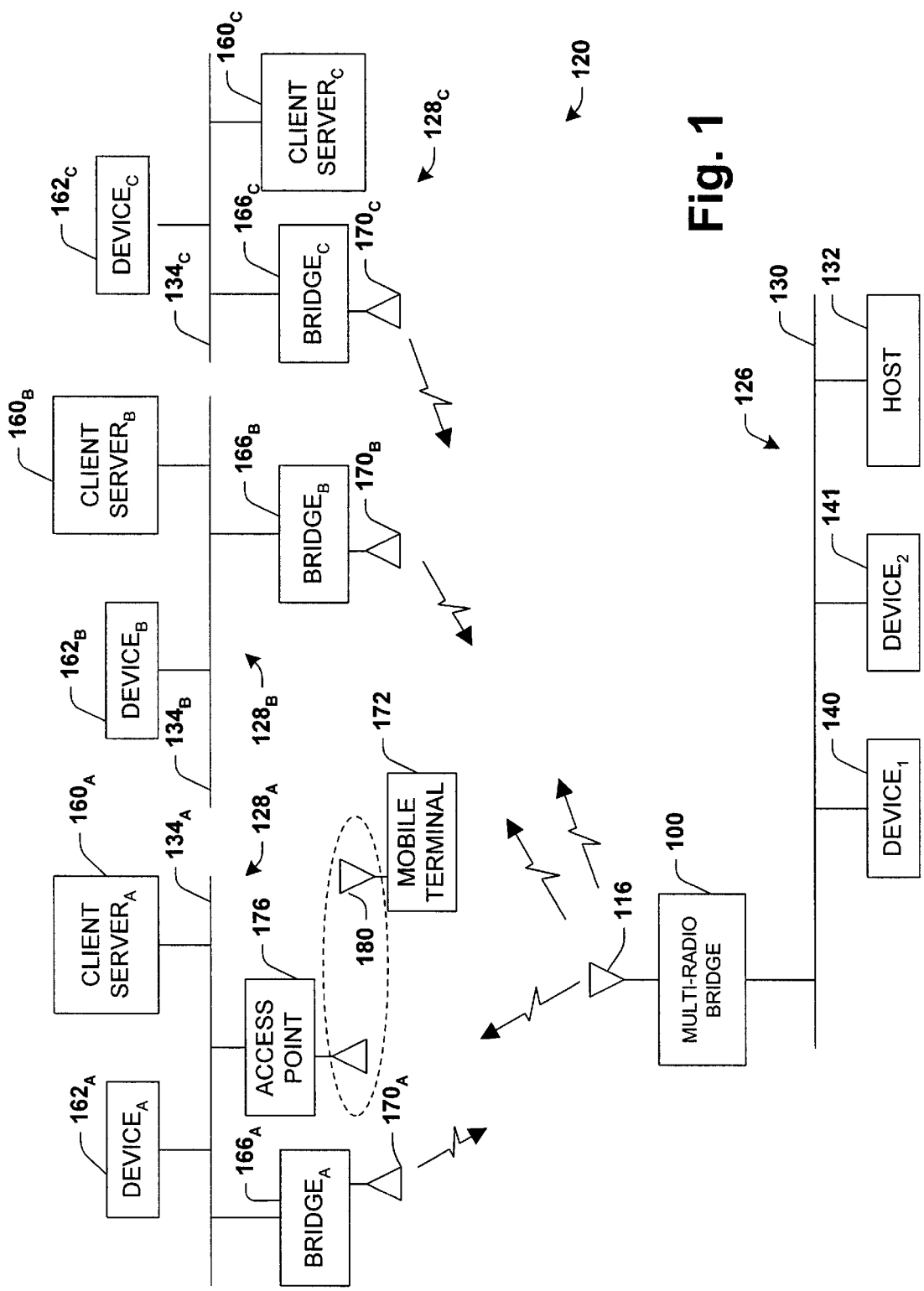
FIG. 1 is a schematic representation of a cellular communication system in accordance with the present invention.

The multi-radio bridge of the present invention will now be described with reference to the drawings, wherein like reference numerals are used to refer to like elements throughout.

Referring initially to FIG. 1, the multi-bridge radio 100 of the present invention is shown incorporated with a cellular communication system generally designated 120. The cellular communication system 120 includes a two-level hierarchial network structure as represented by a host local area network (LAN) 126 and several client-LANs $128_A$, $128_B$ and $128_C$. When referenced collectively, client-LANs $128_A$, $128_B$ and $128_C$ will hereinafter be referred to as client-LANs 128. The host-LAN 126 and client-LANs 128 each include a hardwired data communication path. The hardwired data communication path may be made of a twisted pair cable, shielded coaxial cable or fiber optic lines, for instance, and is often referred to as the system backbone. The host-LAN 126 thus has a system backbone 130 and the client-LANs 128 have respective system backbones $134_A$, $134_B$ and $134_C$ (collectively referred to as system backbone(s) 134). The host-LAN 126 is formed by a host computer 132 connected to the backbone 130 to the multi-radio bridge 100. The host computer 132 serves as the controller for the communication system 120 as is conventional. The host computer 132 may communicate with the components wired to the backbone 130 using a variety of protocols such as the Ethernet protocol or the Token Ring protocol or any other protocol suitable for the purposes of the present invention.

In addition, the host computer 132 generally serves as a central storage medium for system data, etc. as is also conventional.

In the preferred embodiment only one multi-radio bridge 100 is utilized, but the total number of multi-radio bridges 100 may be varied according to a desired implementation. Also, optionally connected to the host-LAN 126 are a plurality of devices 140 (referenced individually as Device$_1$ 140 and Device$_2$ 141) such as work terminals or stations, printers, facsimile devices, data storage facilities, etc. connected to the system backbone 130. The number of devices is arbitrary, and in some environments, the devices 140, 141 may be omitted altogether, such that only the host computer 132 and the multi-radio bridge 100 are connected to the host-LAN 126. The host computer 132, the multi-radio bridge 100, and the devices 140, 141 may be implemented by personal computers. As will be appreciated, the multi-radio bridge 100 of the present invention has utility with virtually any LAN, and is not necessarily limited to the cellular communication system 120 shown in FIG. 1.

The client-LANs 128 include wired to the backbone 134 a client/server 160 such as, for example, an IBM personal computer or a server such as an IBM RS/6000. The client/server 160 may serve as a network controller to control the flow of data between the device 162 and other components wired to the backbone 134. In general, the client/server 160 acts to control local traffic on the client-LAN 128 such as for example local e-mail, queuing for a printer, etc. Thus, the client/server 160 may not be as sophisticated as the host computer 132 thus spawning the need for a bridge to the host computer 132. For example, if Device$_A$ $162_A$ desired to communicate with Device$_B$ $162_B$, it could only do so via the host-LAN 126 which serves as the connecting intermediary between the respective client-LANs 128 the devices are connected to since there is no direct link between client-LANs $128_A$ and $128_B$. The client/server 160 may communicate with the components wired to the backbone 134 using a variety of protocols, such as the Ethernet protocol or the Token Ring protocol.

In order to expand the effective communication range of the client-LANs 128, several wireless client-bridges $166_A$, $166_B$ and $166_C$ are included in the respective client-LANs $128_A$, $128_B$ and $128_C$. When referenced collectively, client-bridges $166_A$, $166_B$ and $166_C$ will hereinafter be referred to as client-bridges 166. Each client-bridge 166 is shown to have an antenna 170. The antennas 170 may for example be of the omni-directional type or yagi-directional type—the omni-directional type providing for a spherical area of coverage, whereas the yagi-type antennas allow for a more elongated, elliptical shaped coverage. Since the wireless bridges 166 in the preferred embodiment are intended to communicate with the multi-radio bridge 100, the antenna 170 employed is of the yagi-type. However, it will be appreciated that any type of antenna suitable for the purposes described herein may be used to carry out the present invention.

As will be discussed in greater detail below, the multi-radio bridge 100 includes two or more radio devices which afford for simultaneous or at least substantially simultaneous communication between the client bridges 166 and the multi-radio bridge 100. The various radio devices can utilize different hopping sequences and/or PN codes to provide for the substantially simultaneous communication. In the preferred embodiment, the radio devices are radio cards Part No. 025 or LM3000 manufactured by Aironet Wireless Communications, Inc., Akron, Ohio. However, it will be appreciated that any radio device suitable for providing simultaneous or substantially simultaneous communication between the client bridges 166 and the multi-radio bridge 100 may be utilized and falls within the scope of the present invention.

Each radio may or may not have its own dedicated processor. (See discussion relating to FIGS. 3–4). Typically FH radios do have a dedicated processor and DS radios do not have a dedicated processor. Regardless, the multi-radio bridge 100 itself has a central processor (See discussion relating to FIGS. 3–4) which controls each of the individual radios. The central processor may be, for example a Motorola 68360 type processor. The multi-radio bridge 100 may have a single antenna and a multiplexer or separate antennas for each specific radio. In an FH system, each radio will be configured to operate using a different hopping pattern. As per FCC regulations, each FH radio would still operate in the 2.4–2.48 Ghz range. In a DS system, each radio will be configured to operate using different PN codes in either the 902–928 Mhz or 2.4–2.48 Ghz FCC regulated bands. It is also possible to have one radio communicate using FH in the 2.4 Ghz range and one radio communicate using DS in the 900 Mhz range. It is also possible for communication to occur in other frequency bands allowable by the FCC.

It is, of course, not possible to have an FH and DS radio communicate in the same band at the same time. Accordingly, care must be taken that an access point for example on a LAN does not conflict with the respective bridge on the LAN in regards to FH systems and DS systems operating in the same frequency band.

Likewise, with respect to bridges, the radios within the bridges can all operate using FH as long as each card uses a frequency hopping scheme that is different from the other radios. Moreover, the radios can all operate using DS as long as they employ different PN codes. Furthermore, there can be a mixture where some radios use FH and others use DS as long as the DS radios are employed in the 900 MHz range thereby differing from the FH radios operating in the 2.4 GHz range—whereby the DS radios are using different PN codes amongst themselves and the FH radios are employing different hopping sequences amongst themselves.

The cellular communication system 120 may also include one or more mobile terminals 172. In this particular embodiment, one mobile terminal 172 is shown communicating with access point 176 located on client-LAN 128$_A$. The mobile terminal(s) 172 is capable of roaming from cell to cell and using a registration and deregistration process to assure a single entry point to the backbone 134. The mobile terminal(s) 172 may include a hand held or arm mounted portable computer, or a portable data form reader mounted to a vehicle, for example. The access point 176 communicates locally with mobile terminal(s) in its respective cell area unlike the bridges which communicate in a dedicated manner from one bridge to another bridge. Although only one access point 176 is shown, it will be appreciated that any number of access points 176 on any number of bridges may be employed within the system 120. Likewise, although only one mobile terminal 172 is shown, it will be appreciated that any number of mobile terminals 172 may be employed within the system 120.

Connected to each mobile terminal is an omnidirectional antenna 180. As discussed above, omnidirectional antennas allow for a generally spherical cell coverage which is often beneficial for roaming mobile terminals, however, other types of antennas could be readily used. The mobile terminal 172 may register with an access point 176 in order to gain access to the network 128. Both the access point 176 and the mobile terminal 172 must be within each others transmission range in order to allow for proper communication to take place.

Figure 2:
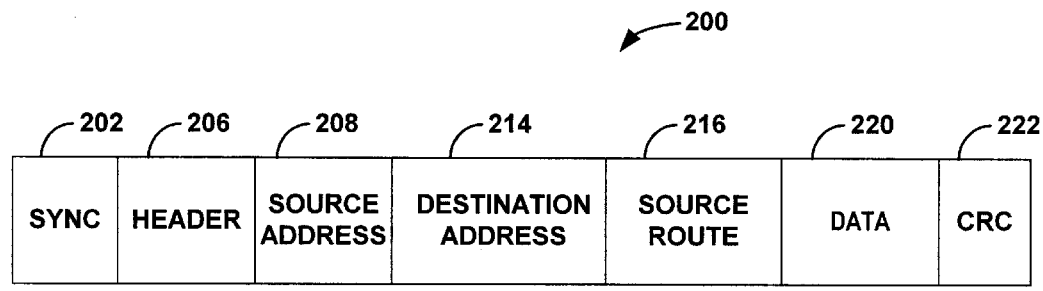
FIG. 2 is a schematic representation of a data packet including a header portion and a data portion.

Referring now to FIG. 2, information is transmitted between the various devices in the communication system 120 preferably in the form of packets 200 using Spread Spectrum wireless communication techniques. As shown, each packet 200 includes a synchronization field 202 which includes synchronizing bits which allow a device receiving the packet 200 an opportunity to "lock on" to the packet 200 as is conventional. A header field 206 follows the synchronization field 202 and includes information such as the length and type of packet. For example, the header field 202 may indicate whether the packet 200 is a type which requires a response from the receiving device. A source address field 208 follows the header field 202 and includes the address of the device from which the packet 200 originated. Following the source address field 208, the packet 200 includes a destination address field 214 which holds the address of the device to which the packet 200 is ultimately destined. In the event the LANs 126, 128 utilize source routing whereby a device transmitting a packet 200 identifies the particular route along the LAN 126, 128 on which the packet 200 is to be transmitted, such information is included in a source routing field 216 included in the packet 200 as is conventional. In a non-source routed LAN 126, 128, the source routing field 216 is omitted as packets 200 are broadcast throughout the entire network absent specified routing. In the preferred embodiment, non-source routing as conventionally known is employed, but certainly source routing could also be used in a conventional manner. A data field 220 in the packet 200 includes various information intended to be communicated to the receiving device. The packet 200 ends with a cyclical redundancy code (CRC) field 222 which serves as an error correcting field according to conventional techniques whereby a receiving device can determine if it has properly received a packet 200.

Figure 3:
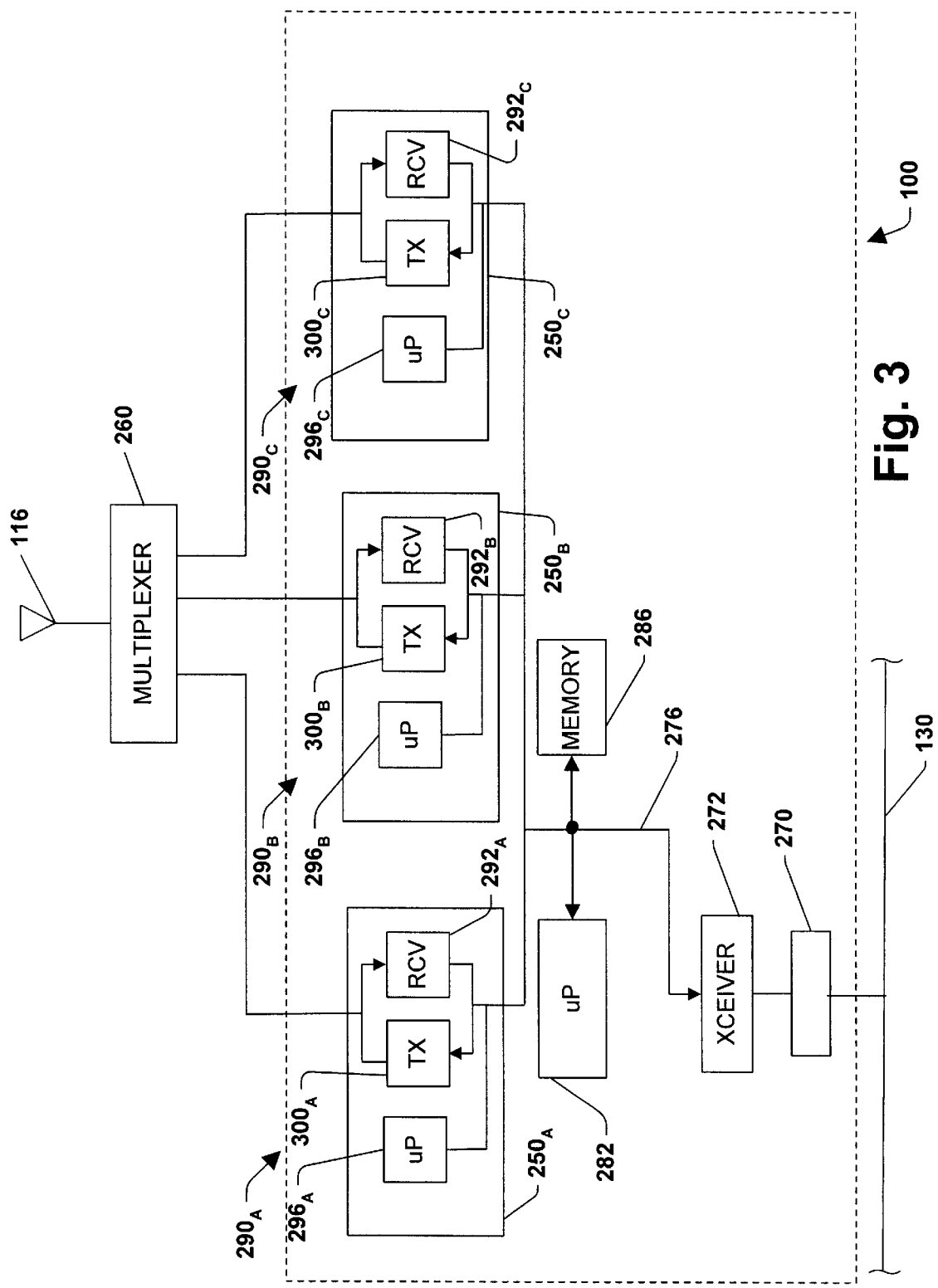
FIG. 3 is a detailed block diagram of an exemplary embodiment of a multi-radio bridge in accordance with the present invention.

Referring now to FIG. 3, a detailed block diagram of one embodiment of the multi-radio bridge 100' is shown. The multi-radio bridge 100' is made up of three separate and discrete radios 250$_A$, 250$_B$ and 250$_C$. When referenced collectively, radios 250$_A$, 250$_B$ and 250$_C$ will hereinafter be referred to as radios 250. The radios 250 are configured to communicate with devices in the system 120 via different channels. According to one particular embodiment, the channels may be different in the particular RF carrier frequency utilized to communicate the information. However, the difference between channels is not limited in the present invention to differences in frequency. For example, the channels may differ by varying the particular hopping sequence used in frequency hopping, or by varying PN code parameters such as the PN code length and the PN code sequence in a manner which provides for low cross-correlation.

Cross-correlation refers to situations where PN code parameters are selected such that a correlator configured to operate at one set of parameters can nevertheless reconstruct a signal sent using another set of PN parameters. For instance, if two PN code parameters are selected having the same PN code length and only differ with respect to one chip in the PN code sequence, it is likely that high cross-correlation will exist given the ability of more correlators to reconstruct signals sent having a few minor discrepancies from what is expected. Thus, in order to utilize PN code parameters to create individual channels for communication, it is necessary to ensure that the parameters are selected such that there is low cross-correlation. In all cases, the primary criteria is simply that the transmissions on the different channels be discernible by the particular radios 250 involved and not by other radios 250 not intended to receive the communication.

In addition, although in this exemplary embodiment three radios 250 are shown, it will be appreciated that the number of radios employed can be increased or decreased depending on user needs and system capacity. For example, the client-LANs operate generally at a 1–2 Megabits per second rate utilizing a conventional medium access protocol. The Ethernet connection along the backbone 130 can handle 10 Megabits per second. Accordingly, a system with such specifications could accommodate between 5–10 client-bridges 166 substantially simultaneously provided that the multi-radio bridge 100 has a corresponding amount of radios 250 and the host computer 132 is capable of processing the data transmitted at that rate.

However, if for example an 11th client-bridge 166 were to be added a buffer or an equivalent thereof would be needed to accommodate this additional traffic. It will be appreciated that as system capacity (i.e., backbone transfer rate, host computer processing capabilities, etc.) is increased, the number of radios 250 employed by the multi-radio bridge 100 can be increased as well thus providing for more simultaneous communication links between client-bridges 166 and the multi-radio bridge 100. Furthermore, it will be appreciated that if the physical capacity for housing radios 250 is reached by a multi-radio bridge 100 but overall system capacity is not reached, additional multi-radio bridges 100 can be added to the backbone 130 for increased simultaneous communication links to client-bridges 166.

The radios 250 are each individually coupled to a multiplexer 260 which serves as an intermediary to antenna 116. The multiplexer 260 serves to prevent outgoing transmissions from one radio 250 to be inadvertently picked up by one of the other radios 250 as an incoming transmission. The multiplexer 260 in the preferred embodiment is situated outside of the multi-radio bridge 100. However, it is to be understood that the scope of the present invention is not limited to such an embodiment and it will be appreciated that the multi-radio bridge 100 may include a multiplexer or not include or utilize a multiplexer. (See e.g., FIG. 4). If utilized, any suitable commercially available multiplexer or equivalent thereof may be employed to carry out the present invention. In a multi-radio bridge 100 that is employing both DS radios and FH radios as discussed above, still only one antenna 116 is needed. For example, in the event two different frequency bands (i.e., 900 MHZ and 2.4 GHz) were being employed, the multiplexer 260 may employ filters to separate the signals being transmitted in the different frequency bands.

The multi-radio bridge 100 is connected to the system backbone 130 via a connector 270 such as a DB-9 or RJ-45 connector. The connector 270 is connected specifically to the network 126 at one end and to a network adapter transceiver 272 included in the multi-radio bridge 100 at the other end. The network adapter transceiver 272 is configured according to conventional network adapter transceiver techniques to allow the radios to communicate over the system backbone 130. The network adapter transceiver 272 is also connected to an internal bus 276 included within the transceiver 240. The transceiver 240 further includes a central processor 282 connected to the bus 276 for controlling and carrying out the operations of the multi-radio bridge 100. The central processor 282, together with the other processors referred to herein, may include any of a variety of different microprocessors, such as the Motorola 68460 or Intel 80486 or Pentium microprocessors or equivalents thereof.

The multi-radio bridge 100 also includes a memory 286 connected to the bus 276. The memory 286 stores program code executed by the central processor 282 to control the other elements within the multi-radio bridge 100 and to carry out the functions described herein. It will be readily apparent to a person having ordinary skill in the art of computer programming how to program the central processor 282 and the other elements within the multi-radio bridge transceiver 240 to carry out the operations described herein using conventional programming techniques based on the descriptions provided herein. As a result, additional detail as to the specific program code has been omitted. The memory 286 also serves to buffer packets 200 of information such as those received over the system backbone 130 or those transmitted to or received from other devices within the network 120. Moreover, the memory 286 functions to store information such where devices (e.g., mobile terminals 172) are registered within the system 120. The registration of mobile terminals 172 may be carried out using conventional techniques. However, such particular registration procedures are not considered essential to the present invention and further detail is omitted.

Each of the radios 250 include RF sections $290_A$, $290_B$ and $290_C$ connected to the bus 276. The RF sections $290_A$, $290_B$ and $290_C$ are collectively referred to as RF sections 290. Each RF section 290 as mentioned above are tied via the multiplexer 260 to an antenna 116. The antennas 116 receive radio signals from and transmit radio signals to other wireless bridges 166 within the system 120 on a respective given channel. Information transmitted from a wireless bridge 166 is received via the antenna 116 and is processed by an RF receiver 292 which demodulates the signal and converts the information to a digital signal. As is conventional, the information from the wireless bridge 166 typically is in the form of a packet 200 including data together with a source identifier (i.e., the particular bridge sending the information) and a destination address identifying the device to which the bridge 166 wishes to transmit the data. Each radio 250 includes its own radio processor 296 which inserts source routing information into the source routing field 216 of the packet 200 received from the wireless bridge 166, if needed. Thereafter, the radio processor 296 stores the packet 200 in the memory 286 until such time as the multi-radio bridge 100 is able to transmit the information packet 200 onto the system backbone 130 via the network adapter transceiver 272 and connector 270.

Information packets 200 which are transmitted to the multi-radio bridge 100 for transmission to one of the wireless bridges 166 are received via the system backbone 130 by the network transceiver 272. The radio processor 296 controls an RF transmitter portion 300 included in the RF section 290, the RF transmitter portion 300 also being connected to the bus 276. The radio processor 296 causes the RF transmitter portion 300 to modulate an RF signal using Spread Spectrum techniques, for example, which in turn carries the information to the desired wireless bridge 166 on the given channel. Exemplary hardware and software for carrying out several of the above-described basic functions of transmitting and receiving data between the system backbone 130 and one or more wireless bridges is found in the LM3000 2.4 Ghz FH radio card which is commercially available from Aironet Wireless Communications, Inc., Akron, Ohio.

The radio processors 290 in the multi-radio bridge radios 250 are equivalent to each other. As mentioned above, the radios 250 are responsible for communications between the multi-radio bridge 100 and the other wireless bridges 166 in the system 120 each on a channel which is different from the channels on which the other wireless bridges 166 operate when communicating with the multi-radio bridge 100. Hence, the RF sections 290 are configured to operate on different channels from each other. This can be by way of using a different RF carrier frequency in the RF transmitter and receiver portions, or by way of using different PN code parameters providing for low cross-correlation, for example.

Since the radios 250 are essentially isolated and each have their own separate radio processor 296, each can independently function to communicate with different wireless bridges 166, respectively. This allows optimum processing times since neither radio processor 296 is processing information for the other radio 250. To the extent it may be desirable for the radio processors 296 to exchange information regarding changes in registration and the like, the radio processors 296 may be programmed to communicate with each other via the central processor 282.

Figure 4:
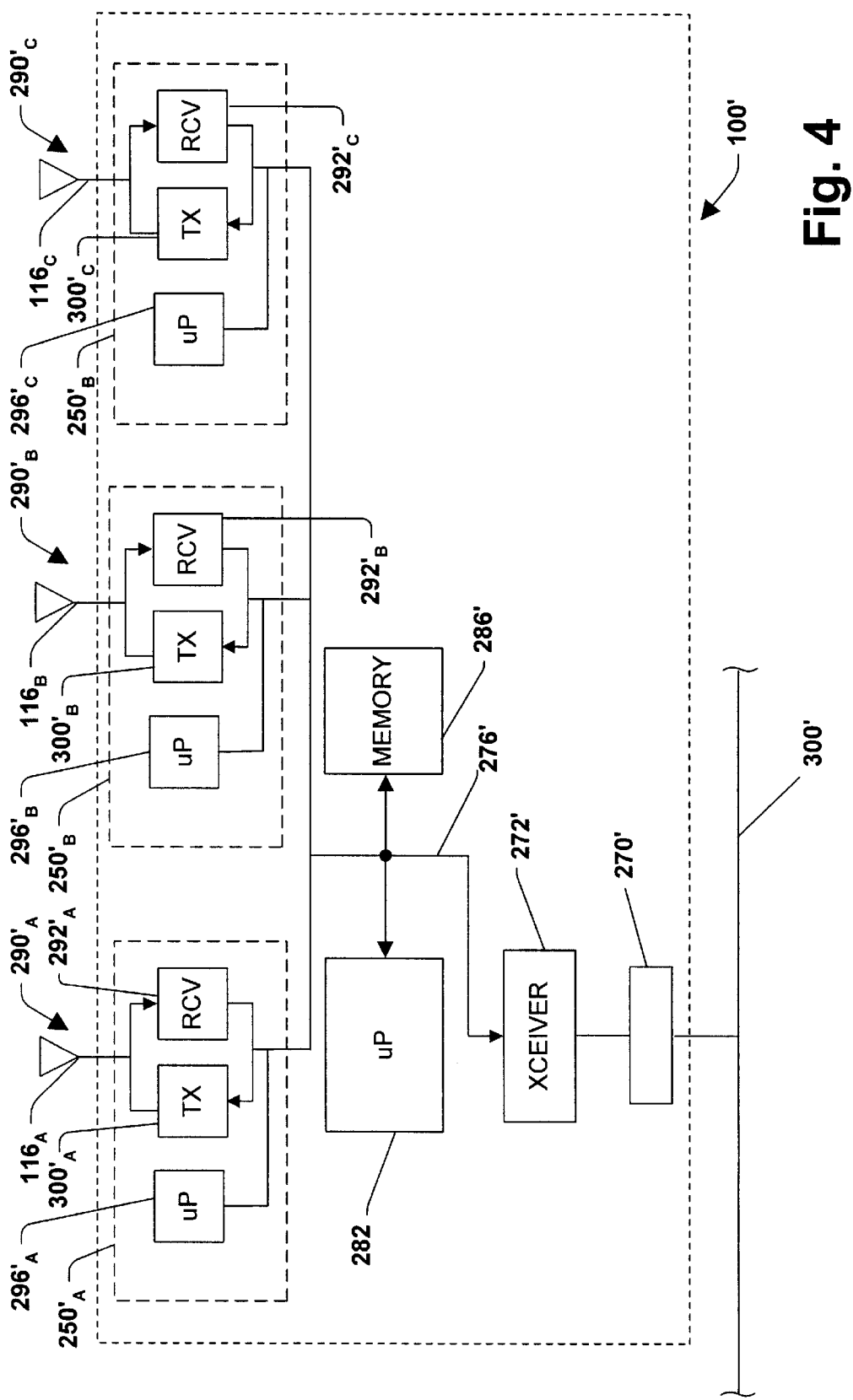
FIG. 4 is a detailed block diagram of another embodiment of a multi-radio bridge in accordance with the present invention.

FIG. 4 shows another embodiment of the multi-radio bridge 100' in which each radio 250 has its own respective antenna 116$_A$, 116$_B$ and 116$_C$ (collectively referred to as antenna 116). In this embodiment, a multiplexer 260 is not employed as in the embodiment of FIG. 3. Accordingly, each RF section receives and transmits signals via its own respective antenna 116. Regardless of whether the multi-radio bridge 100 uses multiple antennas as shown in FIG. 4 or uses a multiplexer 260 as described above, overall system performance should remain about equal. The benefit of using a multiplexer 260 as opposed to dedicated antennas 116 is simply that fewer antennas need to be connected to the multi-radio bridge 100. However, multiplexers 260 are typically very expensive, and therefore it may be more beneficial in certain situations to use dedicated antennas 116 for each radio.

The other components of the multi-radio bridge 100' in FIG. 4 are the same as the components of the multi-radio bridge 100 of FIG. 3 and are designated with a prime "'" after the corresponding reference numeral associated with like components shown in FIG. 3. The operation of the components in FIG. 4 are the same as that discussed above with respect components of the embodiment of FIG. 3 and thus further discussion is omitted for sake of brevity.

Figure 5:
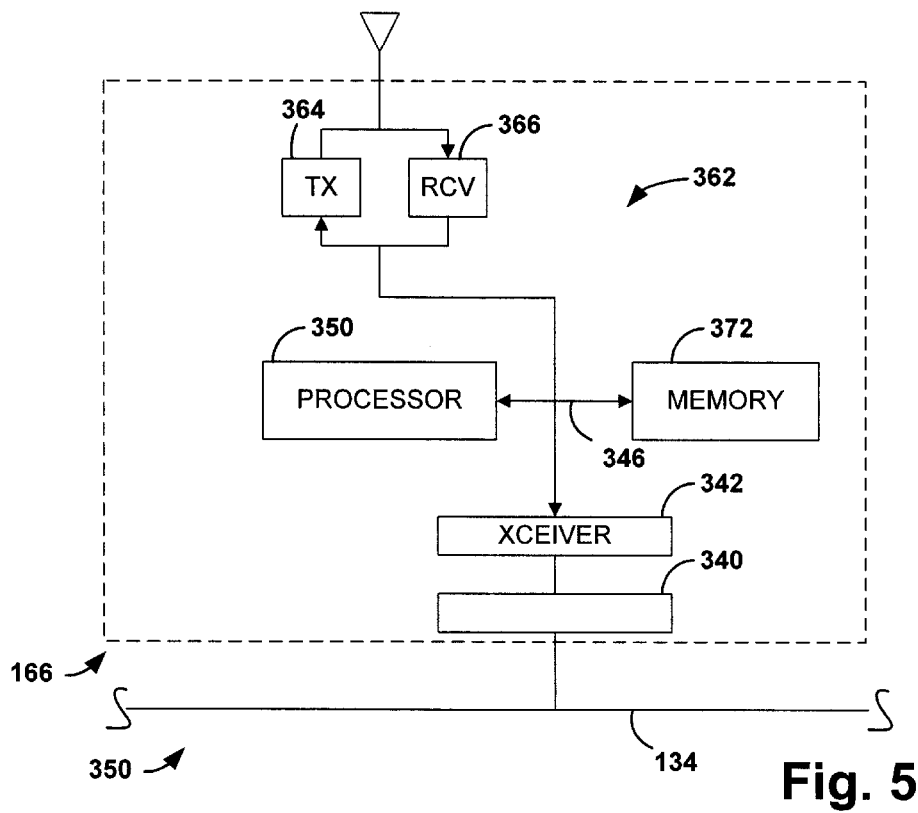
FIG. 5 is a detailed block diagram of a client-bridge in accordance with the present invention.

FIG. 5 is a detailed block diagram of an exemplary embodiment of a wireless client-bridge 166 according to the present invention. Each client-bridge 166 includes a transceiver 342 which is connected to the system backbone 134 via a connector 340 such as a DB-9 or RJ-45 connector. The connector 340 is connected to the system backbone 134 at one end and to a network adapter transceiver 342 at the other end. The network adapter transceiver 342 allows the wireless client bridge 166 to communicate over the system backbone 134. The network adapter transceiver 342 is also connected to an internal bus 346 included within the client-bridge 166. The client-bridge 166 further includes processor 350 connected to the bus 346 for controlling and carrying out the operations of the client bridge 166. The client-bridge 166 includes an RF section 362, connected to bus 346. The RF section 362 includes a corresponding transmitter 364 for transmitting information and receiver 366 for receiving information.

The actual transmission, reception and processing of the data packets via the RF section 362 may be carried out using conventional coding techniques, modulation techniques, etc., and may also utilize dynamically changing transmission parameters.

In operation, the use of multi-radio bridges 100 employing dedicated channels eliminates unnecessary delays which may otherwise occur due to the existence of multiple wireless bridges 166 within the system 120. The processors are configured to differentiate and handle packets 200 as is appropriate and as is discussed more fully below. Thus, for example, a processor may maintains in its corresponding memory a list of each mobile terminal 172 registered to an access point 176. Additionally, a list may be maintained of each client-bridge 166 which is associated with access point 176 or any other particular device in order to extend its range and each mobile terminal currently registered to the associated access point 176. Such information may be used by the processor to determine how information should be handled in each case as is discussed more fully below. The particular protocol for determining which bridge a particular device is associated with can be any conventional protocol. The processor(s) in each of the embodiments of the bridges can be programmed to carry out the functions described herein by a person having ordinary skill in the art based on the present disclosure. As a result, additional detail is omitted.

Figure 6:
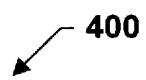
FIG. 6 illustrates a routing table in accordance with the present invention.

The following example further illustrates a protocol scheme that may be employed to route a packet 200 between two devices within the system 120 in accordance with the present invention. Whenever Device$_1$ 140 desires to communicate with Device$_A$ 162$_A$ it must send a packet 200 to the multi-radio bridge 100. The packet 200 includes Device$_1$ 140 in its source address 208 and Device$_A$ 162$_A$ in its destination address 214. The multi-radio bridge 100 will pick up the packet and route it. But first, the multi-radio bridge 100 will read the source address field 208 and destination address field 214 and then place the entire packet 200 in the data field of a shell packet 200' (not shown). The shell packet 200' includes in its header 206' (not shown) the source and destination information read from packet 200. The multi-radio bridge will then route the packet 200 via the shell packet 200'. However, initially it may not know where to route the packet 200 to. Accordingly, the multi-radio 100 initiates a broadcast to all client bridges 166 via all of its radios 250. The multi-radio bridge 100 waits for a response (i.e., acknowledgment from client-bridge 166 not the destination Device$_A$ 162$_A$). Based on which client-bridge 166 sends the acknowledgement, the multi-radio bridge 100 can effectively learn the location of Device$_A$ and store this information into a routing table 400 (FIG. 6). The client-bridges 166 will know via a table stored in its memory whether the sought after Device$_A$ 162$_A$ is located within its respective network. The client-bridge 166A connected via backbone 134 to Device$_A$ 162$_A$ will strip the shell packet 200' and then transmit the packet 200 to Device$_A$ 162$_A$. Device$_A$ 162$_A$ will send the Device$_1$ 140 an acknowledgment which the client-bridge 166A forwards to the multi-radio bridge 100 and the multi-radio bridge 100 then forwards to Device$_1$ 140. In the future, the multi-radio bridge 100 will know via its routing table 400 where Device$_A$ 162$_A$ is located and which of its radios it should send the packet 200 through to reach the client-bridge 166 serving Device$_A$ 162$_A$.

If for example, the destination device was the mobile terminal 172 and according to the routing table 400 the mobile terminal 172 is supposed to be associated with client-bridge 166A but no longer is, client-bridge 166$_A$ may respond back to the multi-radio bridge 100 with a negative acknowledgment which would prompt the multi-radio bridge 100 to send out a broadcast request via all of its radios in the manner described above. Thus, the process described above would be repeated but now with respect to the mobile terminal 172 and once the location of the mobile terminal 172 and its respective client-bridge are determined, the multi-radio bridge would update its routing table 400 with the new information for mobile terminal 172. The routing table 400 may include such information as radios of the multi-radio bridge, corresponding client-bridge information and devices reachable through the client-bridges, etc. The routing table 400 may be preprogrammed by a user or the multi-radio bridge 100 may self-learn routes as is conventional. An example of a commercially available bridge which learns routes is the Aironet BR2000. Additionally, the routing table may contain a combination of preprogrammed and learned routes. The aforementioned learning process is know in the art and further detail will not be provided for sake of brevity.

The present invention is not limited to one type of difference among channels. The primarily criteria is that each of the various channels do not conflict with the radios utilizing the other channel. Those having ordinary skill in the art will appreciate that there are several ways for establishing different channels in accordance with the invention based on the disclosure herein.

It is again noted that a difference among channels only in the PN code sequence or PN code length itself may not be sufficient to avoid interference. What may needed is a combination of PN code parameters which provide low cross-correlation as discussed above. For example, one technique for producing a difference among channels, as an alternative to frequency, is using different PN code lengths. Ideally, the code lengths of the two channels will be substantially different (e.g., 10 bits vs. 15 bits) and the PN code sequence associated with each will be relatively random with respect to the other. Additional methods and techniques for minimizing the cross-correlation are well known throughout the art and could be used in conjunction with this invention.

As will be appreciated, the present invention includes provides for cost effectively increasing the throughput associated with the bridging of multiple LANs together. The radios of the multi-radio bridge afford for substantially simultaneous communication between two or more client-bridges and the multi-radio bridge. The employment of the multiple radios allows for different hopping sequences and/or PN codes to be used so as to avoid collisions between information containing packets. Moreover, system cost is substantially reduced since the multi-radio bridge avoids the need to have to add a new bridge for every new LAN added to the system. Furthermore, in systems having extremely heavy traffic, the multi-radio bridge can dedicate two or more radios (operating at different FH sequences and/or PN codes) to one client-bridge thus doubling or more the amount of network traffic throughput.

What has been described above are preferred embodiments of the present invention. It is, of course, not possible to describe every conceivable combination of components or methodologies for purposes of describing the present invention, but one of ordinary skill in the art will recognize that many further combinations and permutations of the present invention are possible.

What is claimed is:

1. A cellular communication system, comprising:
   a first and second wireless client-bridge, the first client bridge being coupled to a first network backbone of a first computer network including at least one client computer, the second client bridge being coupled to a second network backbone of a second computer network including at least one client computer; and
   a multiple-radio bridge coupled to a third network backbone of a third computer network including at least one host computer, the multiple-radio bridge including:
      first and second radio devices, the first radio device including a first transceiver, the second radio device including a second transceiver, wherein the first and second radio devices are configured to each respectively operate on at least one of a different frequency hopping sequence and a different pseudonoise code, the first radio device being designated for communications with the first client-bridge, and the second radio device being designated for communications with the second client-bridge, the radio devices providing for substantially simultaneous wireless communication between the multiple-radio bridge and the first and second wireless client-bridges, in order to determine the locations of selected client computers and communicate information packets between the host computer and a selected client computer; wherein the multiple-radio bridge further comprises:
         a single processor-actuated routing table for storing the locations of each of the respective client computers, in order to quickly route future information packets and thereby reduce system traffic.

2. The cellular communication system of claim 1, wherein the radio devices are radio cards.

3. The cellular communication system of claim 1, the multiple-radio bridge further including a multiplexer, the multiplexer serving as an intermediary between the radio devices and an antenna.

4. The cellular communication system of claim 3, wherein the multiplexer prevents transmissions from the first radio device to be received as an incoming signal by the second radio device.

5. The cellular communication system of claim 1 wherein the first radio device is a FH radio device.

6. The cellular communication system of claim 1, wherein the first radio device is a DS radio device.

7. The cellular communication system of claim 1, wherein the first radio device is a FH radio device and the second radio device is a DS radio device.

8. The cellular communication system of claim 1, wherein the first radio device is a DS radio operating using a first PN code sequence and the second radio device is a DS radio operating using a second PN code sequence, the second PN code sequence being different from the first PN code sequence.

9. The cellular communication system of claim 1, wherein the first radio device is a FH radio operating using a first hopping pattern and the second radio device is a FH radio operating using a second hopping pattern, the second hopping pattern being different from the first hopping pattern.

10. A multi-radio bridge associated with a first computer network having at least one host computer, comprising:
- a processor for controlling the operation of the multi-radio bridge;
- a single routing table coupled to the processor for storing the locations of the respective client computers, in order to quickly route information packets and thereby reduce system traffic;
- at least one antenna for transmitting and receiving wireless communications; and
- a first and second radio device, the first radio device including a first transceiver, the second radio device including a second transceiver, wherein the first and second radio devices are configured to each respectively operate on at least one of a different frequency hopping sequence and a different pseudonoise code, the first radio device being designated for communications with a first client-bridge associated with a second computer network having at least one client computer, and the second radio device being designated for communications with a second client-bridge associated with a third computer network having at least one client computer, the radio devices communicate the locations of the client computers to the routing table and communicate information packets between the host computer and selected client computers.

11. The multi-radio bridge of claim 10, wherein the radio devices are radio cards.

12. The multi-radio bridge of claim 10, the multiple-radio bridge further including a multiplexer, the multiplexer serving as an intermediary between the radio devices and the antenna.

13. The multi-radio bridge of claim 12, wherein the multiplexer prevents transmissions from the first radio device to be received as an incoming signal by the second radio device.

14. The multi-radio bridge of claim 10, wherein the first radio device is a FH radio device.

15. The multi-radio bridge of claim 10, wherein the first radio device is a DS radio device.

16. The multi-radio bridge of claim 10, wherein the first radio device is a FH radio device and the second radio device is a DS radio device.

17. The multi-radio bridge of claim 10, wherein the multi-radio bridge is self learning.

18. A method for providing substantially simultaneous wireless communication between a first client-bridge associated a first computer network having at least one client computer and a second client-bridge associated with a second computer network having at least one client computer, comprising the steps of:
- using a multi-radio bridge associated with a third computer network having at least one host computer, to serve as an intermediary between the first and second client bridges, the multi-radio bridge including a first and second radio device, the first radio device including a first transceiver, the second radio device including a second transceiver;
- configuring the first and second radio devices to each respectively operate on at least one of a different frequency hopping sequence and a different pseudonoise code;
- designating the first radio device for communications with the first client-bridge;
- designating the second radio device for communications with the second client-bridge;
- determining the locations of the respective client computers and storing the locations, in order to quickly route information packets and thereby reduce system traffic.

19. A multi-radio bridge associated with a first computer network having at least one host computer comprising:
- a processor for controlling the operation of the multi-radio bridge;
- a single routing table for storing the locations of a plurality of client computers, in order to quickly route information packets and thereby reduce system traffic;
- at least one antenna for transmitting and receiving wireless communications; and
- a plurality of radio devices, configured to each respectively operate on at least one of a different frequency hopping sequence and a different pseudonoise code each of the plurality of radio devices being designated for communications with separate client-bridges, wherein each client-bridge is associated with a respective computer network having at least one of the plurality of client computers, the plurality of radio devices communicate the locations of the client computers to the routing table and communicate information packets between the host computer and selected client computers.

* * * * *